(12) United States Patent
Sayfritz et al.

(10) Patent No.: US 10,351,759 B2
(45) Date of Patent: Jul. 16, 2019

(54) METHODS OF ASSESSING OIL FIELD SATURATION THROUGH USE OF REACTIVE PARTITIONING TRACERS

(71) Applicant: RESTRACK AS, Kjeller (NO)

(72) Inventors: Stephen J. Sayfritz, Kjeller (NO); Alexander Krivokapic, Kjeller (NO)

(73) Assignee: RESTRACK AS, Kjeller (NO)

( * ) Notice: Subject to any disclaimer, the term of this patent is extended or adjusted under 35 U.S.C. 154(b) by 0 days.

(21) Appl. No.: 15/314,807

(22) PCT Filed: Jun. 1, 2015

(86) PCT No.: PCT/EP2015/062180
§ 371 (c)(1),
(2) Date: Nov. 29, 2016

(87) PCT Pub. No.: WO2015/181398
PCT Pub. Date: Dec. 3, 2015

(65) Prior Publication Data
US 2017/0198200 A1    Jul. 13, 2017

(30) Foreign Application Priority Data

May 30, 2014  (GB) .................................. 1409664.8
May 30, 2014  (NO) .................................. 20140669

(51) Int. Cl.
*E21B 49/08* (2006.01)
*E21B 47/00* (2012.01)
(Continued)

(52) U.S. Cl.
CPC ............. *C09K 8/58* (2013.01); *E21B 49/08* (2013.01)

(58) Field of Classification Search
CPC ...... E21B 47/1015; E21B 49/00; E21B 49/08; E21B 47/00
See application file for complete search history.

(56) References Cited

U.S. PATENT DOCUMENTS 3,623,842 A    11/1971   Deans
4,168,746 A     9/1979   Sheely
(Continued)

FOREIGN PATENT DOCUMENTS

WO        02/095189 A1    11/2002
WO     2010/140032 A2    12/2010
(Continued)

OTHER PUBLICATIONS

Dias, F.F., Alexander, M, Effect of Chemical Structure on the Biodegradability of Aliphatic Acids and Alcohols . . . Applied Microbiology 22: p. 1114-1118, Dec. 1971.
(Continued)

*Primary Examiner* — Catherine Loikith
(74) *Attorney, Agent, or Firm* — Banner & Witcoff, Ltd.

(57) ABSTRACT

A family of organic tracers is proposed for single well chemical tracer tests, for example for the measurement of residual oil in petroleum reservoirs. The tracers consist of at least one ester of (hydroxyalkyl) benzoic acid of formula (I), wherein at least one of $R_1$ to $R_5$ is a hydroxy alkyl group —$R_7$—OH and each of the remaining $R_1$ to $R_5$ groups is independently selected from H, F, Cl, Br, I, $CF_3CF_2Cl$, $CFCl_2$, $CCl_3$ and at least one of these remaining $R_1$ to $R_5$ groups is not H, $R_6$ is selected from $CH_3$, $C_2H_5$, $C_3H_7$, $C_4H_9$, $CF_3$, $CH_2CF_3$, $CCl_3$, $CH_2CCl_3$, $CH_2CHCl_2$, $CH_2CH_2Cl$, $CH_2CF_3$, $CH_2CHF_2$, $CH_2CH_2F$, $CH_2CH_2CH_2F$, $CH_2CH_2CHF_2$, $CH_2CH_2CF_3$, $CH_2CH_2CH_2Cl$, $CH_2CH_2CH$—$Cl_2$, $CH_2CH_2CCl_3$, $C_3H_6F$, $C_3H_5F_2$, $C_3H_4F_3$, $C_3H_6Cl$, $C_3H_5Cl_2$, $C_3H_5Cl_3$ or a halogenated (hydroxymethyl)phenol and $R_7$ is selected from $CH_2$, $C_2H_4$, $C_3H_6$, $C_4H_8$.

(Continued)

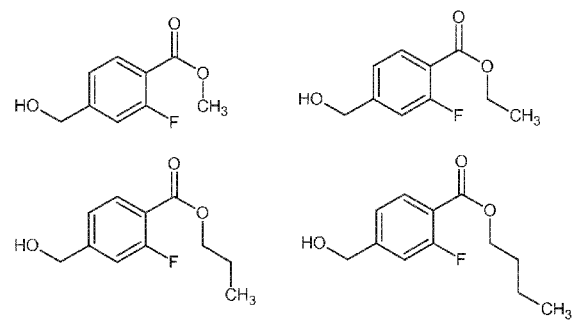

Examples of chemical structures of ester of fluorinated (hydroxymethyl)benzoic acid.

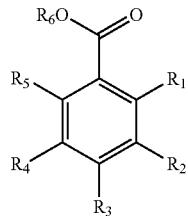

(I)

22 Claims, 2 Drawing Sheets (51) Int. Cl.
*E21B 49/00* (2006.01)
*C09K 8/58* (2006.01)

(56) References Cited

U.S. PATENT DOCUMENTS

| | | | |
|---|---|---|---|
| 6,431,280 B2* | 8/2002 | Bayliss | E21B 33/12 166/263 |
| 9,594,070 B2* | 3/2017 | Rule | G01N 33/241 |
| 2011/0260051 A1 | 10/2011 | Preudhomme et al. | |

FOREIGN PATENT DOCUMENTS

WO 2014/096459 A1 6/2014
WO 2015/069596 A1 5/2015

OTHER PUBLICATIONS

Yang, H., et al., Aromatic Compounds Biodegradation under Anaerobic Conditions and their QSBR Models . . . Science of the Total Environment 358: p. 265-276, 2006.

Setarge, B., et al, Partitioning and Interfacial Tracers to Characterize Non-Aqueous Phase Liquids (NAPLs) in Natural Aquifer Material . . . Phys. Chem. Earth (B) 1999. 24: p. 501-510.

Huseby, Olaf Kristoffer; Sagen, Jan; Dugstad, Oyvind, Single Well Chemical Tracer Tests—Fast and Correct Simulations. Society of Petroleum Engineers 2012, SPE-155608-MS.

Tomich J. F., Dalton R. L., Deans H. A. and Shallenberger L. K., Single-Well Tracer Method to Measure Residual Oil Saturation, Journal of Petroleum Technology, Feb. 1973, pp. 211-218.

Deans H. A. and Majoros S., The Single-Well Chemical Tracer Method for Measuring Residual Oil Saturation. Final Report, US Department of Energy Report No. DOE/BC/20006-18. U.S. Department of Energy, Bartlesville, Oklahoma, U.S.A., 1980.

Aug. 24, 2015—International Search Report and Written Opinion of PCT/EP2015/062180.

* cited by examiner

Figure 1. Examples of chemical structures of ester of fluorinated (hydroxymethyl)benzoic acid.

Figure 2. Example of chemical structure of possible ester of a mono fluorinated (hydroxymethyl)benzoic acid giving two hydrolysis products with significantly different oil/water partitioning coefficients.

Figure 3 – Example compounds A to G

METHODS OF ASSESSING OIL FIELD SATURATION THROUGH USE OF REACTIVE PARTITIONING TRACERS

FIELD OF THE INVENTION

The present invention relates to tracers useful for measurement of residual oil in petroleum reservoirs. In particular, the present invention relates to reactive partitioning tracers suitable for such measurements in the near well zone.

BACKGROUND OF THE INVENTION

Institute for energy technology in Norway (IFE) has, since the nineteen sixties, worked with development of tracer technology for industrial applications. Since the beginning of the nineteen eighties the focus has been on the oil and gas industry. Many passive inter-well (well-to-well) tracers have been tested and qualified, and in recent years, some families of partitioning tracers have also been tested in laboratory and field experiments. The laboratory tests include flooding experiments at simulated reservoir conditions using sand-packed columns containing crude oil at residual oil saturation. The tracer candidates are also tested for thermal stability, and adsorption in closed vials with anaerobe atmosphere, with and without rock materials present.

Reactive partitioning tracers are injected as a pulse in a single well chemical tracer test (SWCTT). Due to the solubility of the reactive partitioning tracers in the oil phase, these tracers will move more slowly through the reservoir than the non-retained compounds. The reactive partitioning tracers are transported normally 2 to 6 meters (up to 15 meters) from the well bore by an additional injection fluid (cf. Tomich et al[6]; Deans and Majoros[7]). The well is then shut-in for a period of time, normally 1-10 days (Deans and Majoros[7]). During the shut-in an amount of the reactive partitioning tracer, reacts to form a new secondary tracer (generated in-situ reaction product) with a lower solubility in the oil phase, ideally significantly lower or "passive" (i.e. soluble only in the water phase). The well is then back-produced and the produced fluid is monitored for both the unreacted portion of the reactive partitioning tracer and the newly formed tracer. When the oil/water partition coefficient for the reactive partitioning tracer and the in-situ generated reaction product are known, the residual oil saturation can be calculated when the difference in migration times for the in-situ generated reaction product and the partitioning tracers have been measured. This concept was first described by Deans, H. A[1] (U.S. Pat. No. 3,623,842). In addition, two other passive (not oil/water partitioning tracer) tracers have been used. The first is added to the whole injection volume and is used to monitor mass balance during the whole single well test. The second is added in the same volume as the reactive partitioning tracer and can be used as a back-up in case the reactive partitioning tracer has fully reacted during the shut-in. This tracer can only be used as a back-up for the reactive partitioning tracer if the reservoir drift during the shut-in is minimal.

The single well chemical tracer test (SWCTT) technology is a standard method for the determination of oil saturation in the near-well zone, and for evaluation of performance of Enhanced Oil Recovery (EOR) operations and EOR pilots. In conventional SWCTT, a tracer (e.g. ethyl acetate or propyl formate) with a known oil/water partition coefficient is introduced with the injection water. The oil/water partition coefficient of the tracer is determined by laboratory experiments. The well is then shut-in for a period of time and then back produced; samples of water are collected for analysis during this back production. During the shut-in some of the tracer reacts to form a secondary tracer in-situ, normally with a lower oil/water partition coefficient. In the case of ethyl acetate, two compounds are formed by hydrolysis ethanol and acetic acid. Normally ethanol is used as the secondary tracer, it can be analysed with the same analytical equipment as ethyl acetate. When the well is back produced, the tracers will move through the reservoir at different velocities based on the partition coefficients and the oil saturation in the volume surrounding the well. The oil saturation for a field with negligible oil flow rates compared to the water flow rates (a field close to residual oil saturation) can be described by chromatographic theory and calculated from the following equation:

$$S = \frac{T_1 - T_2}{T_1 - T_2 - T_1 K_2 + T_2 K_1} \quad \text{(equation 1)}$$

Here $T_1$ and $T_2$ are the retention times of the reactive partitioning tracer (eg ethyl acetate) and the secondary tracer (eg ethanol), respectively, S is the residual oil saturation, and $K_1$ and $K_2$ are the partition coefficient of the reactive partitioning tracer (eg ethyl acetate) and the secondary tracer (reaction product—eg ethanol), respectively, If the partition coefficient is known, the residual oil saturation can be calculated from the measured difference in the arrival times between a non-partitioning/lower partitioning secondary tracer (the reaction product) and the reactive partitioning tracer. This equation is only valid as long as the tracers do not interact with the rock material.

Partitioning tracers are also used in inter-well tracer experiments, where typically no reaction takes place but the tracer is injected at one point and detected in the fluid produced at a second point. Different groups of chemicals have been tested for application as partitioning tracers in these methods. Important parameters are the partition coefficient, hydrolysis rate, the absence of adsorption to rock materials, and the analytical detectability.

Certain compounds, such as esters (eg ethyl acetate and propyl formate), have been used as reactive partitioning tracers in SWCTT, however due to poor limits of detection on-site and presences of the ethanol and methanol in the reservoir, large amounts of these tracers are needed to conduct a test. The reactive partitioning tracer is injected in a high concentration (around 1%), which is a drawback of the current system for several reasons. Firstly, this high concentration of tracer compound may begin to affect the system (oil saturation, water chemistry) which is to be investigated by the test. In addition, this limits the number of reactive partitioning tracers that can be used in a test, normally to one since the total concentration of tracer would otherwise be excessive. It would be advantageous to use several reactive partitioning tracers in the same test to get multiple results that could then be validated and inter-calibrated against each other.

Furthermore, compounds like ethyl acetate have low flash points (−4° C. for pure ethyl acetate). This makes handling and transportation of these compounds difficult and potentially dangerous. Health and safety is an issue of paramount importance when planning a SWCTT operation.

It is therefore of paramount importance to find new SWCTT tracers that can be used by injection in much lower concentrations than 1%, to reduced or remove their effect on the system. Such a large reduction in injection concentration would also allow the use of multiple tracers (if multiple SWCTT tracers are available) and thus allow multiple (eg 2-5) independent oil saturation measurements in a single SWCTT, improving confidence in the measurement. Health and safety is of cause of critical importance, finding new reactive partitioning tracers which can be detected in lower levels on-site would reduce the risk of (amongst other things) fire and chemical spillage compared to a conventional ethyl acetate SWCTT.

In order to be effective as a reactive partitioning tracer, a compound must display certain key properties for effective function. In particular, an effective partitioning tracer should display an appropriate, relatively stable, partition coefficient, an appropriate hydrolysis rate at the pH and temperature conditions of the reservoir, it should be acceptable from a health and safety point of view, it should not interact with rock and other material of the oil well and oil field, and it should be detectable at low levels. Suitable compounds would also advantageously be distinct from the compounds found naturally in oil reservoirs, such that injected compounds or their reaction products can be identified as such down to a low level.

The SWCTT method requires the tracers used to have several parameters within optimal ranges. Firstly the reactive partitioning tracer must have oil/water partitioning and not have any significant interactions with the rock material. Their oil/water partitioning characteristic must also be stable over a range of pH, the pH in the area surrounding the well may change during a SWCTT (eg range pH 5 to 8) due to the injection fluids used and the formation type etc. In addition, it should be detectable in low concentrations, preferably in the field. Secondly, it should undergo a reaction (change) during the shut-in period which produces one or more secondary tracers with several parameters within optimal ranges. The secondary tracer should have a significantly lower oil/water partitioning than the parent reactive partitioning tracer and not have any significant interactions with the rock material. It should be detectable in low concentrations, preferably in the field.

The art of reactive partitioning tracers has developed little over the past 40 years, with ethyl acetate still used as the reactive partitioning tracer of choice in SWCTT methods in spite of several disadvantages with this compound as discussed herein. The present inventors have undertaken to establish an alternative group of reactive partitioning tracers to address some or all of these issues after such a long period. It is not trivial, however, to find suitable new reactive partitioning tracers. Many compounds have been tested but few have been found effective. For example, several apparently likely prospects have shown a pH dependant oil/water partitioning coefficient, which would reduce or remove the information which could be derived from their use. Examples of compounds found not to be suitable for SWCTT reactive partitioning tracers are shown in Table 3.

There is evidently a considerable need for a new class of reactive partitioning tracers which can be used in SWCTT methods. Such tracers would advantageously not be naturally present in the fluid produced from oil reservoirs, would have a moderate partition coefficient which was little dependent upon pH, would partially react under the conditions of a well over several days to produce one or more secondary tracers with lower partition coefficients, would not degrade under the conditions of the well, would not have affinity for the rock or other structures of the well, and/or would be detectable at low levels, preferably with equipment useable at the production site.

SUMMARY OF INVENTION

The present inventors have now established that certain esters of halogenated (hydroxyalkyl) benzoic acids show good oil/water partitioning properties and are not naturally present in an oil field environment. In addition, these compounds can react under reservoir conditions to form compounds (in-situ generated secondary tracers) with lower oil/water partitioning properties (passively follow the aqueous phase). The compounds further provide some or all of the other desirable features of effective SWCTT tracers, as described herein.

In a first aspect, the present invention therefore provides the use of at least one ester of (hydroxyalkyl) benzoic acid of formula i) as a reactive partitioning tracer in a petroleum reservoir.

i)

wherein at least one of $R_1$ to $R_5$ is a hydroxy alkyl group —$R_7$—OH and each of the remaining $R_1$ to $R_5$ groups is independently selected from H, F, Cl, Br, I, $CF_3$ $CF_2Cl$, $CFCl_2$, $CCl_3$ and at least one of these remaining $R_1$ to $R_5$ groups is not H, $R_6$ is selected from $CH_3$, $C_2H_5$, $C_3H_7$, $C_4H_9$, $CF_3$, $CH_2CF_3$, $CCl_3$, $CH_2CCl_3$, $CH_2CHCl_2$, $CH_2CH_2Cl$, $CH_2CF_3$, $CH_2CHF_2$, $CH_2CH_2F$, $CH_2CH_2CH_2F$, $CH_2CH_2CHF_2$, $CH_2CH_2CF_3$, $CH_2CH_2CH_2Cl$, $CH_2CH_2CHCl_2$, $CH_2CH_2CCl_3$, $C_3H_6F$, $C_3H_5F_2$, $C_3H_4F_3$, $C_3H_6Cl$, $C_3H_5Cl_2$, $C_3H_5Cl_3$ or a halogenated (hydroxymethyl)phenol and $R_7$ is selected from $CH_2$, $C_2H_4$, $C_3H_6$, $C_4H_8$.

In one embodiment, at least one of $R_1$ to $R_5$ will independently be hydroxy alkyl groups —$R_7$—OH where $R_7$ is as defined herein throughout. Most preferably, one of $R_1$ to $R_5$ is a hydroxy alkyl group —$R_7$—OH. However, at least two (e.g. two, three or four) groups $R_1$ to $R_5$ may independently be hydroxy alkyl groups —$R_7$—OH where $R_7$ is as defined herein throughout.

In a further aspect, the invention preferably provides the use of at least one ester of (hydroxyalkyl) benzoic acid of formula i) as a reactive partitioning tracer in a petroleum reservoir.

i)

wherein one of $R_1$ to $R_5$ is a hydroxy alkyl group —$R_7$—OH and each of the remaining $R_1$ to $R_5$ groups is independently selected from H, F, Cl, Br, I, $CF_3$ $CF_2Cl$, $CFCl_2$, $CCl_3$ and at least one of these remaining $R_1$ to $R_5$ groups is not H, $R_6$ is selected from $CH_3$, $C_2H_5$, $C_3H_7$, $C_4H_6$, $CF_3$, $CH_2CF_3$, $CCl_3$, $CH_2CCl_3$, $CH_2CHCl_2$, $CH_2CH_2Cl$, $CH_2CF_3$, $CH_2CHF_2$, $CH_2CH_2F$, $CH_2CH_2CH_2F$, $CH_2CH_2CHF_2$, $CH_2CH_2CF_3$, $CH_2CH_2CH_2Cl$, $CH_2CH_2CHCl_2$, $CH_2CH_2CCl_3$, $C_3H_6F$, $C_3H_5F_2$, $C_3H_4F_3$, $C_3H_6Cl$, $C_3H_5Cl_2$, $C_3H_5Cl_3$ or a halogenated (hydroxymethyl)phenol and $R_7$ is selected from $CH_2$, $C_2H_4$, $C_3H_6$, $C_4H_8$ and $C_5H_{10}$ each optionally substituted with 1-2 halogen moieties.

In Formula i), one of $R_1$ to $R_5$ is a hydroxy alkyl group —$R_7$—OH and at least one of groups $R_1$, $R_2$, $R_3$, $R_4$ and/or $R_5$ is a halogenated group such as F, Cl, Br, I, $CF_3$ $CF_2Cl$, $CFCl_2$ or $CCl_3$. More than one of groups of $R_1$ to $R_5$ may be a halogenated group and any two may be the same or different. Preferred groups $R_1$ to $R_5$ include H, Cl, F, Br, $CF_3$ $CF_2Cl$, $CFCl_2$ and $CCl_3$. Particularly preferred groups $R_1$ to $R_5$ include H, F and Cl. It is preferred that at least one of groups $R_1$ to $R_5$ is hydrogen, preferably at least two of groups $R_1$ to $R_5$ are hydrogen. Preferred groups $R_6$ include $CH_3$, $C_2H_5$, $C_3H_7$, $CF_3$, $CH_2F_3$, $CCl_3$, $CH_2CCl_3$, $CH_2CH_2Cl$, $CH_2CH_2CF_3$, $CH_2CH_2CH_2Cl$, $CH_2CH_2Cl_3$, $C_3H_6F$. Particularly preferred groups $R_6$ include $CH_3$, $C_2H_5$, $C_3H_7$. Preferred $R_7$ groups include methylene, ethylene and propylene (e.g. n-propylene or isopropylene). Butylene or pentylene (either linear or branched) groups are possible for $R_7$ but may require other polar groups in the molecule to avoid an excessively high K-value.). $R_7$ groups may be substituted with halogen moieties, particularly 1 or 2 fluorine or chlorine molecules. $R_7$—OH groups may thus be, for example, $CH_2CHFOH$, $CH_2CF_2OH$, $CFHCH_2$—OH, $CF_2CH_2OH$, $CH_2CHClOH$, $CH_2CCl_2OH$, $CClHCH_2OH$, $CCl_2CH_2OH$, $CHFCHClOH$, $CHClCHFOH$, $CHFClCH_2OH$ $CH_2CFClOH$ etc.

The hydroxyalkyl moiety of the compound of formula i) may be positioned at any point around the ring, relative to the benzoic acid moiety. Three preferred configurations are thus shown in formulae ii), iii), and iv) below, in which these two groups are ortho-, meta-, and para-respectively.

In formulae ii), iii) and vi), each of $R_1$ to $R_7$ is as indicated above for the compounds of formula i), although evidently in formulae ii), iii) and iv) $R_1$, $R_2$ and $R_3$ will be respectively replaced by $R_7OH$.

Taking a preferred example of the meta-hydroxyalkyl benzoic acid compounds of formula iv) above, some preferred embodiments are illustrated below as formulae iv)A, iv)B and iv)C In each of iv)A, iv)B and iv)C, $R_1$, $R_2$, $R_4$, $R_5$ and $R_6$ are as described herein for formula i) and other compatible formulae and in particular are as defined in preferred aspects indicated herein. Where esters of (hydroxyalkyl) benzoic acid are indicated herein throughout, any of the compounds of formulae i)-iv), iv)A, iv)B and/or iv)C may be used in any embodiment where context allows. It is preferred that compounds of formula iv) are used and particularly that those of formulae iv)A and iv)B, particularly iv)A are used.

The present invention is directed to the use of esters of halogenated (hydroxyalkyl) benzoic acid as reactive tracers in single well chemical tracer tests or in other operations for non-aqueous phase liquid quantification measurements. The esters of (hydroxyalkyl) benzoic acid are particularly useful as reactive partitioning tracers in single well chemical tracer tests because of their hydrolysis products have lower oil/water portioning rate and the rate of the hydrolysis reaction under reservoir conditions is compatible with the general design of single well chemical tracer tests and low adsorption to rock material. The compounds are unique in the environment of oil and gas reservoirs, and they can be detected at low concentrations using sophisticated analytical techniques (eg GC-MS and GC-ECD as discussed herein). The partition coefficients of the tracers are highly suitable for single well chemical tracer tests.

Further compounds of formula i) wherein two or three of groups $R_1$ to $R_5$ are hydroxyalkyl groups —$R_7$—OH include:

Wherein each of $R_1$ to $R_7$ is as defined herein throughout.

BRIEF DESCRIPTION OF THE DRAWINGS AND TABLES

TABLE 1 shows the calculated partition coefficients from static batch experiments for 2-Fluoro-4-(hydroxymethyl) benzoic acid and 4 esters of 2-Fluoro-4-(hydroxymethyl) benzoic acid TABLE 2 shows the calculated partition coefficients from static batch experiments for 2-Fluoro-4-(hydroxymethyl) benzoic acid and 4 esters of 2-Fluoro-4-(hydroxymethyl) benzoic acid TABLE 3 shows the calculated partition coefficients from static batch experiments ethyl ester of Fluorescien and 2,3-difluoro hydroxybenzoic acid and 2 esters of 2,3-difluoro hydroxybenzoic acid.

DETAILED DESCRIPTION

Halogenated alcohols are both unique in the reservoir environment and more chemically and biologically stable than corresponding molecules without halogen atoms. There are several references in the literature to the biodegradability of alcohols [2], [3], [4]. Previous experience with per-deuterated butanol as partitioning tracer at IFE and information found in the literature indicate that presence of halogen atoms in the molecules will lead to less biodegradation of the selected alcohols. However, to function as SWCTT reactive tracers, many additional parameters must be satisfied, as discussed herein.

Structural formulas of examples of compounds from a group of (hydroxyalkyl)benzoic acid esters tested are shown and described herein, including in Formula 1) and Error! Reference source not found. The compounds could be analyzed using gas chromatography with mass spectrometric detection (GC-MS) in produced water after clean-up and optional pre-concentration of the water samples. Detection limits of 50 µg/l (ppb) could be obtained depending on the level of interferences from the sample matrix. They may also be detected by gas chromatography with electron capture detection (GC-ECD)

TABLE 1

Examples of measured oil/water partition coefficients, K-values, at given conditions (Ionic strength in aqueous phase 0.776 and model oil (isooctane 60%/toluene 30%/1-octanol 10%) at 50° C.)

| pH (Aqueous phase) | 2-fluoro-4-(hydroxymethyl) benzoic acid | Methyl ester of 2-fluoro-4-(hydroxymethyl) benzoic acid | Ethyl ester of 2-fluoro-4-(hydroxymethyl) benzoic acid | Proply ester of 2-fluoro-4-(hydroxymethyl) benzoic acid | Butyl ester of 2-fluoro-4-(hydroxymethyl) benzoic acid |
|---|---|---|---|---|---|
| 6.2 | 0.0 | 3.2 | 10.9 | 41.7 | 127.5 |
| 7.0 | 0.0 | 3.4 | 11.2 | 44.2 | 126.1 |
| 8.0 | 0.0 | 3.3 | 11.8 | 48.7 | 132.2 |

TABLE 2

Examples of measured oil/water partition coefficients, K-values, at given conditions (Ionic strength in aqueous phase 0.776, pH 6.2 at 50° C.)

| Oil phase | 2-fluoro-4-(hydroxymethyl) benzoic acid | Methyl ester of 2-fluoro-4-(hydroxymethyl) benzoic acid | Ethyl ester of 2-fluoro-4-(hydroxymethyl) benzoic acid | Proply ester of 2-fluoro-4-(hydroxymethyl) benzoic acid | Butyl ester of 2-fluoro-4-(hydroxymethyl) benzoic acid |
|---|---|---|---|---|---|
| North field 1 | 0.0 | 0.6 | 1.6 | 5.9 | 18.7 |
| North field 2 | 0.0 | 0.8 | 2.5 | 7.5 | 23.6 |

TABLE 3

Examples of measured oil/water partition coefficients, K-values, at given conditions (Ionic strength in aqueous phase 0.776 and model oil (isooctane 60%/toluene 30%/1-octanol 10%) at 50° C.)

| pH (Aqueous phase) | Ethyl ester of Fluorescien | 2,3-difluoro hydroxybenzoic acid | Methyl ester of 2,3-difluoro hydroxybenzoic acid | Propyl ester of 2,3-difluoro hydroxybenzoic acid |
|---|---|---|---|---|
| 6.2 | 16.2 | 0.0 | 3.9 | 53.9 |
| 7.0 | 3.9 | 0.0 | 0.9 | 12.1 |
| 8.0 | 0.6 | 0.0 | 0.2 | 2.2 |

Partition coefficients of the compounds of formula I and the tracers described herein may vary slightly with temperature. However, this effect is generally predictable from knowledge of the conditions of use and any variation can be measured in the laboratory prior to use. Suitable correction may therefore be made for any temperature variation of K-values.

Esters of 2-fluoro-4-(hydroxymethyl) benzoic acid from methyl to Butyl have been tested successfully as representative reactive partitioning tracers, but other fluorinated and chlorinated esters of (hydroxyalkyl) benzoic acids and combinations of chlorinated and fluorinated esters of (hydroxyalkyl) benzoic acids are predicted to function well due to similar chemical properties. In addition, to the (hydroxymethyl) benzoic acid examples, fluorinated and chlorinated esters of (hydroxyethyl) benzoic acid and combinations of chlorinated and fluorinated esters of (hydroxyethyl) benzoic acid are also predicted to function well due to similar chemical properties.

The present invention relates to the use of at least one ester of fluorinated (hydroxyalkyl) benzoic acids of formula i) as a reactive partitioning tracer in a petroleum reservoir, as well as to the corresponding compounds for that use. Compounds of formula i) have the general formula:

(i)

wherein one of $R_1$ to $R_5$ is a hydroxy alkyl group —$R_7$—OH and each of the remaining $R_1$ to $R_5$ groups is independently selected from H, F, Cl, Br, I, $CF_3$ $CF_2Cl$, $CFCl_2$ and $CCl_3$ and wherein at least one of these remaining $R_1$ to $R_5$ groups is not H, $R_6$ is selected from $CH_3$, $C_2H_5$, $C_3H_7$, $CF_3$, $CH_2CF_3$, $CCl_3$, $CH_2CCl_3$, $CH_2CH_2Cl$, $CH_2CH_2CF_3$, $CH_2CH_2CH_2Cl$, $CH_2CH_2Cl_3$, $C_3H_6F$, $C_3H_4F_3$, $C_3H_6Cl$, $C_3H_5Cl_3$ or a halogenated (hydroxymethyl)phenol and $R_7$ is selected from $CH_2$, $C_2H_4$, $C_3H_6$, $C_4H_8$ and $C_5H_{10}$ each optionally substituted with 1-2 halogen moieties. Preferred R groups include those indicated herein both above and below.

Particular examples of compounds of formula i) which are suitable for use in all aspects of the present invention include at least one fluorinated ester of (hydroxyalkyl) benzoic acid of formulae F1 to F16:

F1

F7

F8

F9

F10

F11

F12

-continued

F13

F14

F15

F16 wherein $R_6$ is as defined herein and each R group is independently selected from H, Cl, Br, I, $CF_2Cl$, $CFCl_2$ and $CCl_3$. Preferably each R group is independently selected from H and Cl. In one embodiment, all R groups in formulae F1 to F24 are hydrogen. In one embodiment 1, 2 or 3 R groups of formulae F1 to F16 are Cl. The remaining R groups may be any specified herein for $R_1$ to $R_5$ but will preferably be H.

Further particular examples of compounds of formula i) which are suitable for use in all aspects of the present invention include least one chlorinated ester of (hydroxy-alkyl) benzoic acid of formulae Cl1 to C16:

Cl1

Cl2

Cl3

Cl4

Cl5

Cl6

Cl7

Cl8

Cl9

Cl10

Cl11

Cl12

Cl13

Cl14

Cl15

Cl16 wherein $R_6$ is as defined herein and each R group is independently selected from H, F, Br, I, $CF_2Cl$, $CFCl_2$ and $CCl_3$. Preferably each R group is independently selected from H and F. In one embodiment, all R group sin formulae Cl1 to C16 are hydrogen. In another embodiment 1, 2 or 3 R groups of formulae Cl1 to Cl16 are F. The remaining R groups may be any specified herein for $R_1$ to $R_5$ but will preferably be H.

In formulae F1 to F16 and Cl1 to Cl16 and the mixed halides below, structures showing the "-para" arrangement of benzyl ester and the hydroxyl alkyl group has been shown. Furthermore, the hydroxymethyl group has been used for clarity in all such examples. It should be noted that the corresponding compounds wherein the hydroxyethyl moiety is used in place of the hydroxymethyl are similarly advantageous and the hydroxypropyl may also be used in that position. Corresponding compounds in which hydroxyethyl or hydroxypropyl moieties replace the hydroxymethyl are therefore appropriate embodiments of the invention.

Similarly, in compounds of formulae F1 to F16, C1 to C16 and those of mixed halides below, the "para-" arrangement of ester and hydroxyalkyl moieties may be replaced by similar groups in an "ortho-" or "para" arrangement. Thus, for example, all compounds of formulae F1 to F16, C1 to C16 and those of mixed halides below may be modified so as to exchange the position of the hydroxyalkyl group with any of the groups at the "ortho-" or "meta" positions. Correspondingly, for example, formula Cl1 may be modified to cover any of the compounds of formula Cl1a to Cl1i as shown below and corresponding modifications may be made to the other formulae.

Figure 3:
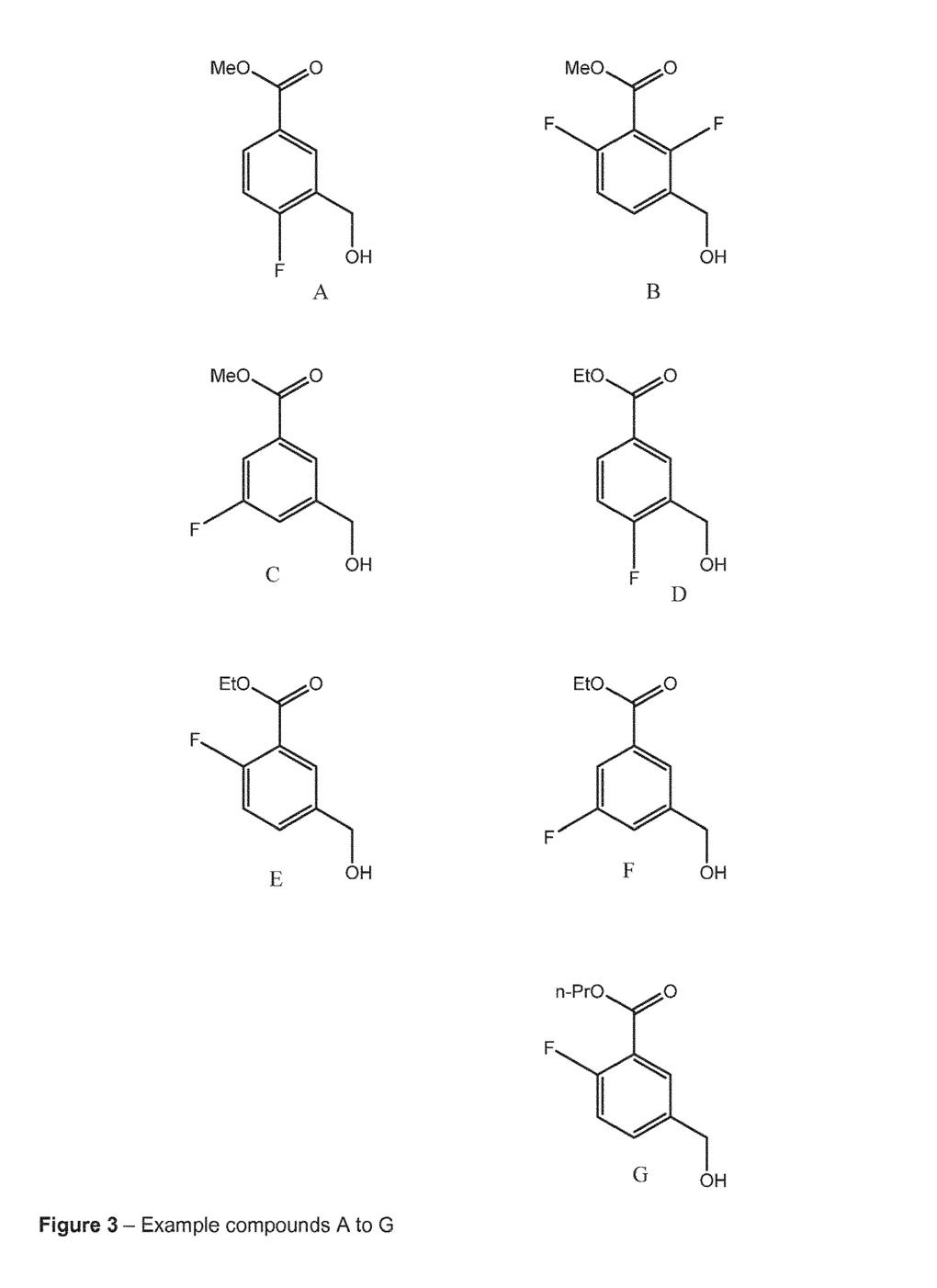
FIG. 3 shows the structures of example compounds A to G of the invention.

Some tested compounds having other combinations of substitution and hydroxyalkyl group position include compounds A to G shown in FIG. 3.

These compounds have K-values measured as follows:

| Compound | Approx. K-value over pH range 5.5 to 8 |
|---|---|
| A | 1 to 1.8 |
| B | 2.3 to 3 |
| C | 1.6 |
| D | 3.7 to 4.7 |
| E | 1.3 to 2 |
| F | 6 to 6.7 |
| G | 6.8 to 8.4 |

The K-values can vary with pH, as shown below for compounds B and F:

| pH (Aqueous phase) | Methyl ester of 2-6-difluoro-3-hydroxymethyl benzoic acid (B) | Ethyl ester of 3-fluoro-5-hydroxymethyl benzoic acid (F) |
|---|---|---|
| 6.2 | 3.0 | 6.7 |
| 7.0 | 2.8 | 6.3 |
| 8.0 | 2.4 | 6.1 |

Further particular examples of compounds of formula i) which are suitable for use in all aspects of the present invention include at least one of the following chlorinated fluorinated ester of (hydroxymethyl)benzoic acid;

The Cl and F groups in the above formulae may evidently be exchanged such that F may be present in place of Cl and vice versa. $R_6$ is as defined herein.

Figure 1:
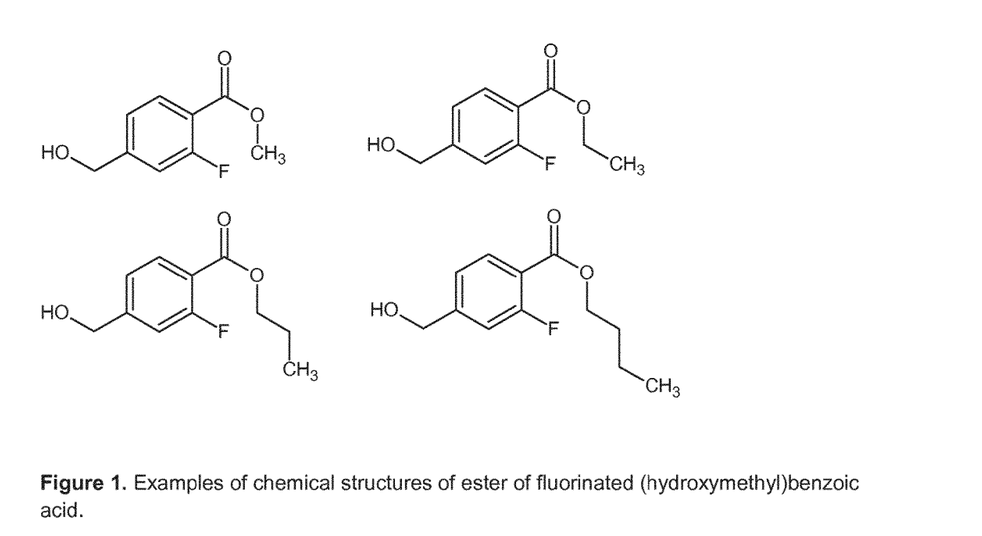
FIG. 1 shows examples of chemical structures of ester of fluorinated (hydroxymethyl)benzoic acid.

In one preferred embodiment of the invention, the compounds of formula i) which are suitable for use in all aspects of the present invention are the compounds shown in FIG. 1.

In a further, highly effective embodiment compatible with all aspects of the invention, the (hydroxyalkyl)benzoic acid ester is at least one ester of 2-fluoro-4-(hydroxymethyl) benzoic acid. The esters of (hydroxyalkyl)benzoic acids for use in the various aspects of the present invention have appropriate oil/water partitioning coefficients, undergoe hydrolysis under reservoir conditions and at an appropriate rate and form secondary tracers with appreciate properties after hydrolysis. In addition, they are detectable in low concentration and thus reduce the amount of tracer needed per SWCTT.

As used herein, the term "secondary tracer" is used to indicate a tracer chemical which is formed by the reaction of a reactive partitioning tracer, especially a reactive partitioning tracer of the invention (e.g. a tracer of formula i) to iv)). Such a secondary tracer will typically partition more strongly into water (have a lower partition coefficient) than the parent reactive partitioning tracer. The reaction (e.g. hydrolysis) of the reactive partitioning tracer to the secondary tracer will typically be to around 5 to 95% under the conditions of the well, during the period that the well is "shut in" to allow this reaction. This will preferably be around 20 to 80%, more preferably 30 to 70%. The reaction period will typically be around 1 to 11 days, preferably 2 to 5 days, such as around 3 days.

In one embodiment, the partition coefficient of one or more secondary tracer(s) may be higher than the partition coefficient of the reactive partitioning tracer. This potentially requires longer back-production of the well, which may be undesirable. However, the use of such a tracer may provide valuable information about the well, particularly when used with another tracer, such as a secondary tracer with low partition coefficient formed from a reactive partitioning tracer (e.g. as described herein). Thus, in one embodiment at least one secondary tracer has a partition coefficient higher than or equal to that of the reactive partitioning tracer. In another embodiment at least one secondary tracer has a partition coefficient higher than that of the reactive partitioning tracer. In a further embodiment, two or more secondary tracers are generated from one or two reactive partitioning tracers wherein at least one at least one secondary tracer has a partition coefficient higher than or equal to that of the reactive partitioning tracer and at least one secondary tracer has a partition coefficient higher than that of the reactive partitioning tracer.

Preferably, the compounds of formula i) (and the preferred compounds as indicated herein) are hydrolysed to the secondary tracer over a period of several days under typical oil reservoirs conditions (typical temperature range is 30 to 80° C. in the near well zone of water flooded oil reservoirs)

A further key feature of the compounds used in the various aspects of the present invention is their high detectability. Specifically, the compounds of formula i) and their hydrolysis products (and the preferred compounds as indicated herein) are preferably detectable by GC-MS down to a concentration of 100 ppb (parts per billion) or lower. Preferably this detection limit will be 10 ppb or lower, more preferably 100 ppt (parts per trillion). They may also be detected GC-ECD down to a concentration of 500 ppb. Preferably this detection limit will be 50 ppb or lower, more preferably 1 ppb. This high detectability will reduced the amount of tracer needed per test from several barrels of tracer to a few kg or less. This will allow the co-injected of multiple tracers, giving multiple determinations of oil saturation in a single operation.

Furthermore, the concentration of the reactive partitioning tracer injected in the methods and uses of the present invention may be lower than that used in previous methods. For example, the tracer may be injected in a carrier fluid (e.g. in an aqueous carrier fluid such as seawater or fresh water) at a concentration of less than 1% (e.g. 0.0001 to 0.75%). Such a concentration will preferably be less than 0.5% and more preferably less than 0.1%. Very low concentrations may potentially increase the required injection volume or decrease ease of detection but concentrations of 0.001 to 0.05% may be suitable.

A still further important feature of the compounds used in the various aspects of the present invention is their low volatility. This combined with their high detectability will reduce the potential risks involved in their operational use compared to standard SWCTT tracers like ethyl acetate.

Figure 2:
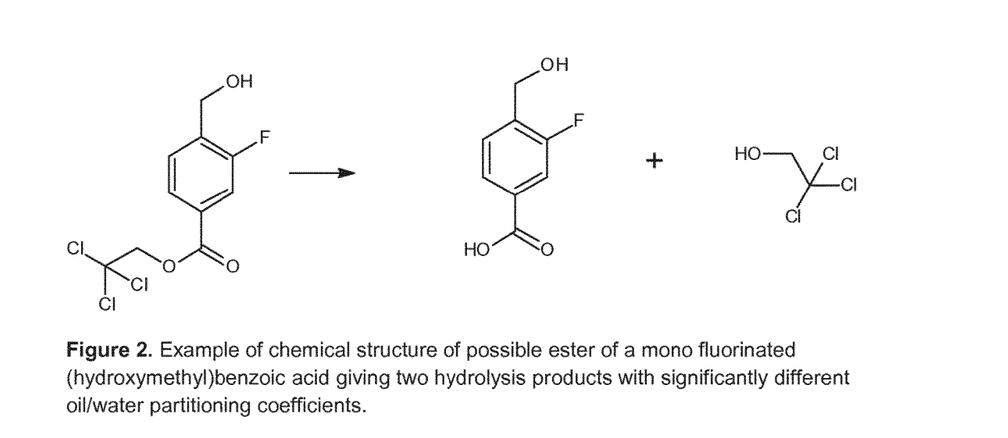
FIG. 2. shows an example of chemical structure of possible ester of a mono fluorinated (hydroxymethyl)benzoic acid giving two hydrolysis products with significantly different oil/water partitioning coefficients.

In known reactive tracer tests using ethyl acetate, only ethanol is typically analysed. This may be because the acetic acid component cannot readily be distinguished from acetic acid naturally occurring in the produced fluid, which reduces the sensitivity of the test. It would be advantageous to use both reaction products as tracers. This is especially valuable if the two products have different oil/water partition coefficients. In one preferred embodiment, a first reaction product has a low partition coefficient (a passive tracer (otherwise termed a non-partitioning tracer) or near non-partitioning tracer, substantially only soluble in water) and a second reaction product preferably has an oil/water partition coefficient between that of the original reactive partitioning tracer and the first (near non-partitioning) reaction product. An example is shown if FIG. 2.

A yet further feature of the compounds used in the various aspects of the present invention is their low reaction with and sorption onto materials typically found in oil fields such as rock, particularly limestone and/or sandstone. Compounds for use in a SWCTT should have a partition coefficient that allows the chemical to be transported a useful distance from the well and allows the chemical transformation to provide useful information. Where the partition coefficient outside of the useful range, the tracer may not travel effectively and/or there may be insufficient difference between the partition coefficients before and after chemical transformation.

A still further feature of the esters of (hydroxyalkyl) benzoic acid used in the various aspects of the present invention is their highly suitable partition coefficients. For example, compounds of formula i) or preferred compounds as described herein may have partition coefficients between 0.5 and 25. The partition coefficients of some example compounds at given conditions are shown in Table 1 and 2 herein. In one embodiment, the compounds of formula i) herein have partition coefficients between 0.1 and 100, between 0.5 and 25, between 1 and 20 or between 1 and 15.

One important aspect of the present invention relates to a method of assessing the oil saturation of an oil field (petroleum reservoir) having an injection well, said method comprising:
a) injecting at least one reactive partitioning tracer (particularly a tracer of formula i)) having a known oil/water partition coefficient into said injection well;
b) after the injection is complete and the tracer(s) have been transported a given distance from the well bore (normally 1 to 40 meters), the well is 'shut-in' for a period of time, (normally 1 to 7 days, e.g. 3 days). During the 'shut-in' the majority of the reaction of the reactive partitioning tracer occurs, producing at least one second tracer (normally a hydrolysis product).
c) the well is then back produced and the measuring of the presence and concentration of said reactive partitioning tracer and the secondary tracer (reaction product) in produced water from said injection well.
d) determining the retention times for each of said reactive partitioning tracer and said second tracer;
e) relating the retention times of said reactive partitioning tracer and said second tracers and the partition coefficient of said reactive partitioning tracer and said second tracer to the oil saturation of said oil field In such a method, the first tracer will be a ester of (hydroxyalkyl)benzoic acid tracer. This will be a "reactive partitioning" tracer and may have a partition coefficient as described herein. The second tracer will be generated in-situ by the reaction (e.g. hydrolysis) of the first tracer.

The invention further provides for a method for evaluation of performance of an Enhanced Oil Recovery (EOR) operation at an oil field (petroleum reservoir) having an injection well. Such a method will typically comprise determining residual oil saturation according to any method described herein and further relating the residual oil saturation so-determined to the performance of the Enhanced Oil Recovery (EOR) operation.

The distance that the tracers should be transported in step b) will depend upon the conditions of the well and the volume over which the analysis is desired. Typical distances will be around 10 to 40 meters, preferably 2 to 25 meters and more preferably 2 to 11 meters.

Another possibility will be to inject two or more reactive partitioning tracers. The reactive partitioning tracers will have different partition coefficients. Partitioning tracers will be selected based among other things on the size of their partition coefficient. The injection fluid volume and rate as well as the assumed oil saturation in the near well zone will be considered when selecting the partitioning tracers. One of the selected partitioning tracers will be an ester of (hydroxyalkyl)benzoic acid as described herein while the other partitioning tracers may be an ester of (hydroxyalkyl)benzoic acid, preferably another isomer or other suitable partitioning tracers.

In one preferred embodiment, the first tracer is a reactive oil/water partitioning tracer, such as described herein. If the partition coefficients for the reactive partitioning tracers and the hydrolysis products of said reactive partitioning tracers are known, the residual oil saturation can be calculated or estimated from the measured difference in the arrival times between the passive tracer and the partitioning tracer using equation 1 as described herein.

$$S = \frac{T_1 - T_2}{T_1 - T_2 - T_1 K_2 + T_2 K_1} \quad \text{(equation 1)}$$

Here $T_1$ and $T_2$ are the retention times of the reactive partitioning tracer (eg ester of 2-Fluoro-4-(hydroxymethyl) benzoic acid and the secondary tracer (eg 2-Fluoro-4-(hydroxymethyl)benzoic acid), respectively, S is the residual oil saturation, and $K_1$ and $K_2$ are the partition coefficient of the reactive partitioning (eg ester of 2-Fluoro-4-(hydroxymethyl)benzoic acid and the secondary tracer (eg 2-Fluoro-4-(hydroxymethyl)benzoic acid) respectively (e.g. see Table 1).

Other equations and approximations which can be used in calculating residual oil saturation are well known [5-7]. Similarly, non-partitioning tracers are well established and will be well known to those skilled in the art.

REFERENCES

1. Deans, H. A, *Method of Determining Fluid Saturation in Reservoirs,* 1971. U.S. Pat. No. 3,623,842
2. Dias, F. F., Alexander, M, *Effect of Chemical Structure on the Biodegradability of Aliphatic Acids and Alcohols.* Applied Microbiology 22: p. 1114-1118.
3. Yang, H., et al., *Aromatic Compounds Biodegradation under Anaerobic Conditions and their QSBR Models.* Science of the Total Environment 358: p. 265-276.
4. Setarge, B., et al, *Partitioning and Interfacial Tracers to Characterize Non-Aqueous Phase Liquids (NAPLs) in Natural Aquifer Material.* Phys. Chem. Earth (B) 1999. 24: p. 501-510.
5. Huseby, Olaf Kristoffer; Sagen, Jan; Dugstad, Oyvind, *Single Well Chemical Tracer Tests-Fast and Correct Simulations.* Society of Petroleum Engineers 2012, SPE-155608-MS.
6. Tomich J. F., Dalton R. L., Deans H. A. and Shallenberger L. K., Single-Well Tracer Method to Measure Residual Oil Saturation, Journal of Petroleum Technology, February 1973, pp. 211-218.
7. Deans H. A. and Majoros S., The Single-Well Chemical Tracer Method for Measuring Residual Oil Saturation. Final Report, US Department of Energy Report No. DOE/BC/20006-18. U.S. Department of Energy, Bartlesville, Okla., U.S.A., 1980

What is claimed is:

1. A method of assessing oil saturation of an oil field (petroleum reservoir) having an injection well, said method comprising:
   a) injecting at least one reactive partitioning tracer of formula i having a known oil/water partition coefficient into said injection well;
   b) shutting in the well after the injection is complete and the tracer(s) have been transported from a well bore, whereby to allow reaction of the reactive partitioning tracer to generate at least one second tracer;
   c) back-producing the well and measuring a presence and concentration of said reactive partitioning tracer and said secondary tracer(s) in produced water from said injection well;
   d) determining retention times for each of said reactive partitioning tracer and said second tracer(s); and
   e) relating the retention times of said reactive partitioning tracer and said second tracer(s) and the partition coefficient of said reactive partitioning tracer and said second tracer(s) to the oil saturation of said oil field;
   wherein said reactive partitioning tracer is an ester of (hydroxyalkyl) benzoic acid tracer of formula i):

wherein at least one of $R_1$ to $R_5$ is a hydroxy alkyl group —$R_7$—OH and each of the remaining $R_1$ to $R_5$ groups is independently selected from H, F, Cl, Br, I, $CF_3$, $CF_2Cl$, $CFCl_2$, $CCl_3$ and at least one of these remaining $R_1$ to $R_5$ groups is not H, $R_6$ is selected from $CH_3$, $C_2H_5$, $C_3H_7$, $C_4H_9$, $CF_3$, $CH_2CF_3$, $CCl_3$, $CH_2CCl_3$, $CH_2CHCl_2$, $CH_2CH_2Cl$, $CH_2CF_3$, $CH_2CHF_2$, $CH_2CH_2F$, $CH_2CH_2CH_2F$, $CH_2CH_2CHF_2$, $CH_2CH_2CF_3$, $CH_2CH_2CH_2Cl$, $CH_2CH_2CHCl_2$, $CH_2CH_2CCl_3$, $C_3H_6F$, $C_3H_5F_2$, $C_3H_4F_3$, $C_3H_6Cl$, $C_3H_5Cl_2$, $C_3H_5Cl_3$ or a halogenated (hydroxymethyl)phenol and $R_7$ is selected from $CH_2$, $C_2H_4$, $C_3H_6$, $C_4H_8$.

2. The method as claimed in claim 1 wherein at step b) hydrolysis of the ester of (hydroxyalkyl) benzoic acid of formula i) takes place to generate an acid component and an alcohol component which both constitute independent secondary tracers.

3. The method of claim 2 wherein said acid component and said alcohol component are both halogenated.

4. The method of claim 1 wherein the tracer(s) are transported 1 to 40 meters before shutting the well.

5. A method for evaluation of performance of an Enhanced Oil Recovery (EOR) operation at an oil field (petroleum reservoir) having an injection well, said method comprising:
   a) injecting at least one reactive partitioning tracer of formula i having a known oil/water partition coefficient into said injection well;
   b) shutting in the well after the injection is complete and the tracer(s) have been transported from a well bore, whereby to allow reaction of the reactive partitioning tracer to generate at least one second tracer;
   c) back-producing the well and measuring a presence and concentration of said reactive partitioning tracer and said secondary tracer(s) in produced water from said injection well;
   d) determining retention times for each of said reactive partitioning tracer and said second tracer(s); and
   e) relating the retention times of said reactive partitioning tracer and said second tracer(s) and the partition coefficient of said reactive partitioning tracer and said second tracer(s) to the performance of the Enhanced Oil Recovery (EOR) operation at said oil field;
   wherein said reactive partitioning tracer is an ester of (hydroxyalkyl) benzoic acid tracer of formula i):

wherein at least one of $R_1$ to $R_5$ is a hydroxy alkyl group —$R_7$—OH and each of the remaining $R_1$ to $R_5$ groups is independently selected from H, F, Cl, Br, I, $CF_3$, $CF_2Cl$, $CFCl_2$, $CCl_3$ and at least one of these remaining $R_1$ to $R_5$ groups is not H, $R_6$ is selected from $CH_3$, $C_2H_5$, $C_3H_7$, $C_4H_9$, $CF_3$, $CH_2CF_3$, $CCl_3$, $CH_2CCl_3$, $CH_2CHCl_2$, $CH_2CH_2Cl$, $CH_2CF_3$, $CH_2CHF_2$, $CH_2CH_2F$, $CH_2CH_2CH_2F$, $CH_2CH_2CHF_2$, $CH_2CH_2CF_3$, $CH_2CH_2CH_2Cl$, $CH_2CH_2CHCl_2$, $CH_2CH_2CCl_3$, $C_3H_6F$, $C_3H_5F_2$, $C_3H_4F_3$, $C_3H_6Cl$, $C_3H_5Cl_2$, $C_3H_5Cl_3$ or a halogenated (hydroxymethyl)phenol and $R_7$ is selected from $CH_2$, $C_2H_4$, $C_3H_6$, $C_4H_8$.

6. A method of assessing oil saturation of an oil field (petroleum reservoir) having an injection well, said method comprising:
injecting at least one reactive partitioning tracer of formula i) having a known oil/water partition coefficient into said injection well;
wherein said reactive partitioning tracer is an ester of (hydroxyalkyl) benzoic acid tracer of formula i):

wherein at least one of $R_1$ to $R_5$ is a hydroxy alkyl group —$R_7$—OH and each of the remaining $R_1$ to $R_5$ groups is independently selected from H, F, Cl, Br, I, $CF_3$, $CF_2Cl$, $CFCl_2$, $CCl_3$ and at least one of these remaining $R_1$ to $R_5$ groups is not H, $R_6$ is selected from $CH_3$, $C_2H_5$, $C_3H_7$, $C_4H_9$, $CF_3$, $CH_2CF_3$, $CCl_3$, $CH_2CCl_3$, $CH_2CHCl_2$, $CH_2CH_2Cl$, $CH_2CF_3$, $CH_2CHF_2$, $CH_2CH_2F$, $CH_2CH_2CH_2F$, $CH_2CH_2CHF_2$, $CH_2CH_2CF_3$, $CH_2CH_2CH_2Cl$, $CH_2CH_2CHCl_2$, $CH_2CH_2CCl_3$, $C_3H_6F$, $C_3H_5F_2$, $C_3H_4F_3$, $C_3H_6Cl$, $C_3H_5Cl_2$, $C_3H_5Cl_3$ or a halogenated (hydroxymethyl)phenol and $R_7$ is selected from $CH_2$, $C_2H_4$, $C_3H_6$, $C_4H_8$.

7. The method of claim 5 wherein the tracer(s) are transported 1 to 40 meters before shutting the well.

8. The method of claim 5 wherein only one of $R_1$ to $R_5$ is a hydroxy alkyl group —$R_7$—OH as defined in claim 6.

9. The method of claim 8 wherein the ester of (hydroxyalkyl) benzoic acid of formula i) is of formula:

wherein each of $R_1$ to $R_7$ is as defined in claim 8.

10. The method of claim 8 wherein at least one of groups $R_1$ to $R_5$ is F, Cl, $CF_2Cl$, $CFCl_2$ or $CCl_3$.

11. The method of claim 8 wherein 1, 2 or 3 of groups $R_1$ to $R_5$ is F or Cl.

12. The method of claim 8 wherein said ester of (hydroxyalkyl) benzoic acid of formula i) is at least one fluorinated ester of (hydroxyalkyl) benzoic acid of any or formulae F1 to F16:

F1

F2

F3

F4

F5

F6

F7

F8

F9

F10

F11

F12

F13

F14

F15

F16 wherein $R_6$ is as defined in claim 8 and each R group is independently selected from H, Cl, Br, I, $CF_2Cl$, $CFCl_2$ and $CCl_3$.

13. The method of claim 12 wherein each R group is independently selected from H and Cl.

14. The method of claim 12 wherein all R groups in formulae F1 to F16 are hydrogen.

15. The method of claim 12 wherein 1, 2 or 3 R groups of formulae F1 to F16 are Cl.

16. The method of claim 8 wherein said ester of (hydroxyalkyl) benzoic acid of formula i) is at least one chlorinated ester of (hydroxyalkyl) benzoic acid of any of formulae Cl1 to Cl16:

Cl1

Cl7

Cl2

Cl8

Cl3

Cl9

Cl4

Cl10

Cl5

Cl11

Cl6

Cl12 wherein each R group is independently selected from H, F, Br, I, $CF_2Cl$, $CFCl_2$ and $CCl_3$.

17. The method of claim 16 wherein each R group is independently selected from H and F.

18. The method of claim 16 wherein all R groups in formulae Cl1 to Cl16 are hydrogen.

19. The method of claim 16 wherein 1, 2 or 3 R groups of formulae Cl1 to Cl16 are F.

20. The method of claim 8 wherein said ester of (hydroxyalkyl) benzoic acid of formula i) is at least one of the following chlorinated fluorinated esters of (hydroxyalkyl) benzoic acid:

wherein the Cl and F groups in the above molecules may be exchanged such that F may be present in place of Cl and vice versa.

21. The method of claim 8 wherein $R_6$ is selected from methyl, ethyl, $CF_3$, $CH_2CF_3$, $CCl_3$ and $CH_2CCl_3$.

22. The method of claim 8 wherein only one of groups $R_1$ to $R_5$ is a hydroxy alkyl group —$R_7$—OH as defined in claim 8.

* * * * *